(12) United States Patent
Henderson

(10) Patent No.: US 9,522,742 B2
(45) Date of Patent: Dec. 20, 2016

(54) SHORT LANDING WARNING

(71) Applicant: The Boeing Company, Chicago, IL (US)

(72) Inventor: Mark Hall Henderson, Seattle, WA (US)

(73) Assignee: The Boeing Company, Chicago, IL (US)

(*) Notice: Subject to any disclaimer, the term of this patent is extended or adjusted under 35 U.S.C. 154(b) by 54 days.

(21) Appl. No.: 14/218,672

(22) Filed: Mar. 18, 2014

(65) Prior Publication Data
US 2015/0266590 A1 Sep. 24, 2015

(51) Int. Cl.
B64D 45/04 (2006.01)
G05D 1/06 (2006.01)
G08G 5/04 (2006.01)
B64D 45/08 (2006.01)
G08G 5/00 (2006.01)

(52) U.S. Cl.
CPC ............ B64D 45/04 (2013.01); B64D 45/08 (2013.01); G05D 1/0653 (2013.01); G05D 1/0676 (2013.01); G08G 5/045 (2013.01); G05D 1/0607 (2013.01); G08G 5/0047 (2013.01); G08G 5/04 (2013.01)

(58) Field of Classification Search
None
See application file for complete search history.

(56) References Cited

U.S. PATENT DOCUMENTS

| 6,785,594 B1 | 8/2004 | Bateman et al. |
| 6,980,892 B1* | 12/2005 | Chen ................. G01C 21/005 340/970 |
| 2003/0206120 A1 | 11/2003 | Ishihara et al. |
| 2008/0312779 A1* | 12/2008 | Sacle ................. G01C 23/005 701/7 |

(Continued)

FOREIGN PATENT DOCUMENTS

| EP | 1309837 | 5/2003 |
| WO | WO 02/16870 A2 | 2/2002 |

OTHER PUBLICATIONS

Asiana Airlines Flight 214, viewed and downloaded Sep. 1, 2015, Wikipedia, encyclopedia.*

(Continued)

Primary Examiner — Fadey Jabr
Assistant Examiner — Kevin P Mahne
(74) Attorney, Agent, or Firm — Baker & Hostetler LLP

(57) ABSTRACT

A method can include determining that an aircraft is on approach to a runway. The method can include determining a flight path vector (FPV) location of the aircraft based at least in part on a projected landing location with respect to the runway and determining a current airspeed of the aircraft. The method can also include performing at least one of the following: issuing a landing short alert to a pilot of the aircraft if the FPV location is at or before the runway threshold, issuing an airspeed caution alert if the FPV location is between the runway threshold and the target runway location and if the current airspeed is below a landing short envelope, and determining not to issue an alert if the FPV location is between the runway threshold and the target runway location and if the current airspeed is at or above the landing short envelope.

18 Claims, 10 Drawing Sheets

(56) References Cited

U.S. PATENT DOCUMENTS

| | | | |
|---|---|---|---|
| 2010/0079308 A1* | 4/2010 | Fabre | G08G 5/0086 340/951 |
| 2012/0095625 A1* | 4/2012 | Ishihara | B64C 25/00 701/16 |
| 2014/0354456 A1* | 12/2014 | Gannon | G08G 5/0047 340/972 |

OTHER PUBLICATIONS

International Patent Application No, PCT/US2015/017145; Int'l Search Report and the Written Opinion; dated May 29, 2015; 9 pages.

* cited by examiner

SHORT LANDING WARNING

BACKGROUND

The present application is generally related to avoiding aircraft landing short of runways. If aircraft do not approach runways within appropriate ranges of airspeed and rates of descent, the aircraft can land short of the runway.

An air data inertial reference unit (ADIRU) of an aircraft can supply air data (e.g., airspeed, angle of attack, and altitude) and inertial reference information (e.g., position and attitude) to a pilot's electronic flight instrument system displays as well as to other systems on the aircraft. The ADIRU can output a flight path angle (FPA) that can be displayed on both a primary flight display (PFD) and heads-up display (HUD) as a flight path vector (FPV). The FPV can show the aircraft path due to its energy and a pilot can use the FPV to determine the aircraft's flight path.

An aircraft can be landed without the use of a FPV. In such a case, the aircraft can be manually flown to the landing. During manual landing, the pilot maintains airspeed (manually or with autothrottles) and uses either on-board landing guidance (e.g., glideslope indication) or visual guidance from the runway (e.g., visual approach slope indicator (VAST) lights) to indicate whether the aircraft's approach is within an appropriate range, too high, or too low.

A terrain awareness and warning system (TAWS) can be used to prevent accidents where aircraft crash into terrain. Examples of TAWSs are ground proximity warning systems and enhanced ground proximity warning systems. A TAWS can output glideslope alerts and terrain alerts that can be used to alert pilots if they are too far off the path of landing the aircraft on the runway. However, as an aircraft approaches a runway, it is possible not to get any warnings.

SUMMARY

Illustrative examples of the present disclosure include, without limitation, methods, structures, and systems. In one example, a method can include determining that an aircraft is on approach to a runway. A runway threshold and a target runway location can be associated with the runway. The method can also include determining a flight path vector (FPV) location of the aircraft based at least in part on a projected landing location with respect to the runway and determining a current airspeed of the aircraft. The method can also include performing at least one of the following: issuing a landing short alert to a pilot of the aircraft if the FPV location is at or before the runway threshold, issuing an airspeed caution alert if the FPV location is between the runway threshold and the target runway location and if the current airspeed is below a landing short envelope, and determining not to issue an alert if the FPV location is between the runway threshold and the target runway location and if the current airspeed is at or above the landing short envelope.

In one example, the method can also include determining a landing reference speed based at least on part on a flap setting of the aircraft on approach. If the FPV location is at or before the runway threshold and the current aircraft speed is below the landing reference speed, then the landing short alert comprises a short landing and airspeed warning alert. If the FPV location is at or before the runway threshold and the current aircraft speed is above the landing reference speed, then the landing short alert can include an landing short caution alert if a current altitude of the aircraft is above a warning threshold line or a short landing and pull up warning alert if the current altitude of the aircraft is below the warning threshold line. In another example, if the airspeed caution alert is issued, the airspeed caution alert can be issued in response to determining that the current airspeed of the aircraft is less than the landing short envelope. Any of the alerts can be issued by a display system and/or an audio system.

In another example, a system can include an air data inertial reference unit (ADIRU), a terrain awareness and warning system (TAWS), and an alert system. The ADIRU can be configured to determine a flight path vector (FPV) angle of the aircraft and a current airspeed of the aircraft. The TAWS can include a runway database having stored therein indications of a runway threshold and a target runway location associated with the runway. The TAWS can be further configured to determine a FPV location based on the FPV angle and to determine an alert condition. The alert condition can be one of the following: a landing short alert if the FPV location is at or before the runway threshold, an airspeed caution alert if the FPV location is between the runway threshold and the target runway location and if the current airspeed is below a landing short envelope, and no alert if the FPV location is between the runway threshold and the target runway location and if the current airspeed is at or above the landing short envelope. The alert system can be configured to issue an alert if the alert condition comprises the landing short alert or the airspeed caution alert.

In one example of the system, the ADIRU, the TAWS, and the alert system are located on the aircraft. The alert system can include a display configured to display a word or an indication of the alert condition. The alert system can include an audio system configured to sound a word or a noise of the alert condition. The TAWS and the ADIRU can be part of one or more computing systems. The target runway location can be an instrument landing system (ILS) location on the runway. In one example, the TAWS can be configured to determine the alert condition when an ILS system of the aircraft is not enabled.

Other features of the methods, structures, and systems are described below. The features, functions, and advantages can be achieved independently in various examples or may be combined in yet other examples, further details of which can be seen with reference to the following description and drawings.

BRIEF DESCRIPTION OF THE DRAWINGS

Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
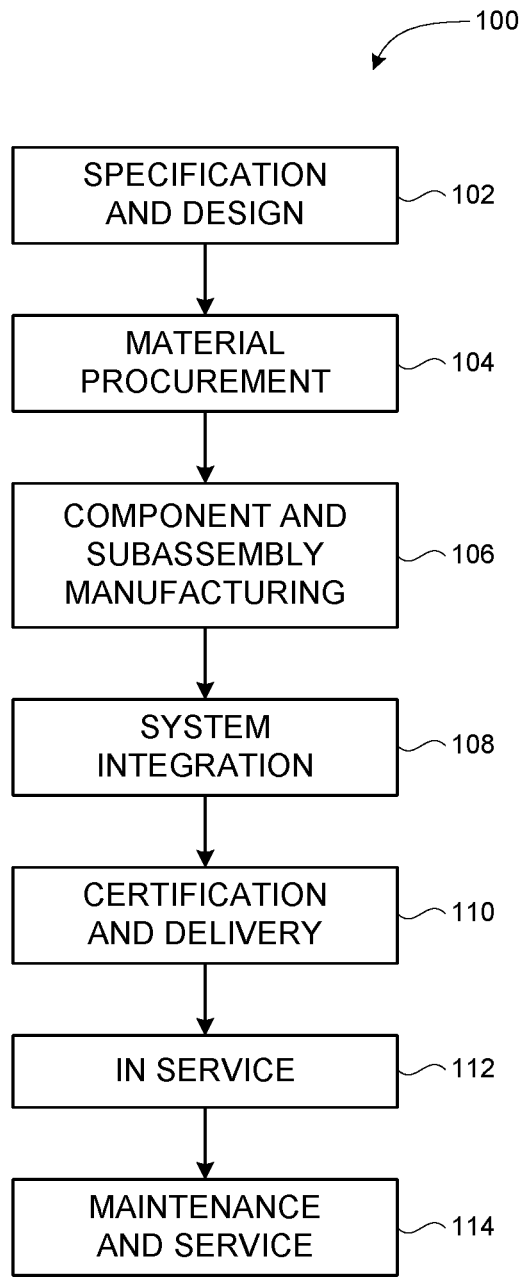
FIG. 1 depicts a flow diagram of an aircraft production and service methodology.
Figure 2:
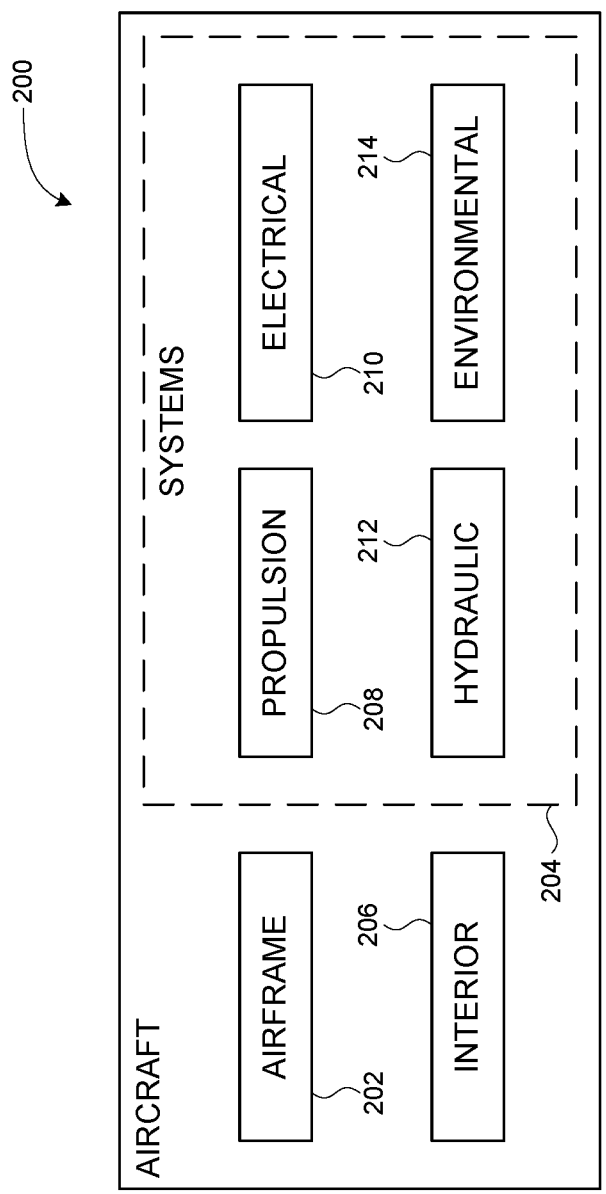
FIG. 2 depicts a block diagram of an aircraft.

Examples in this disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatuses and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Figure 3:
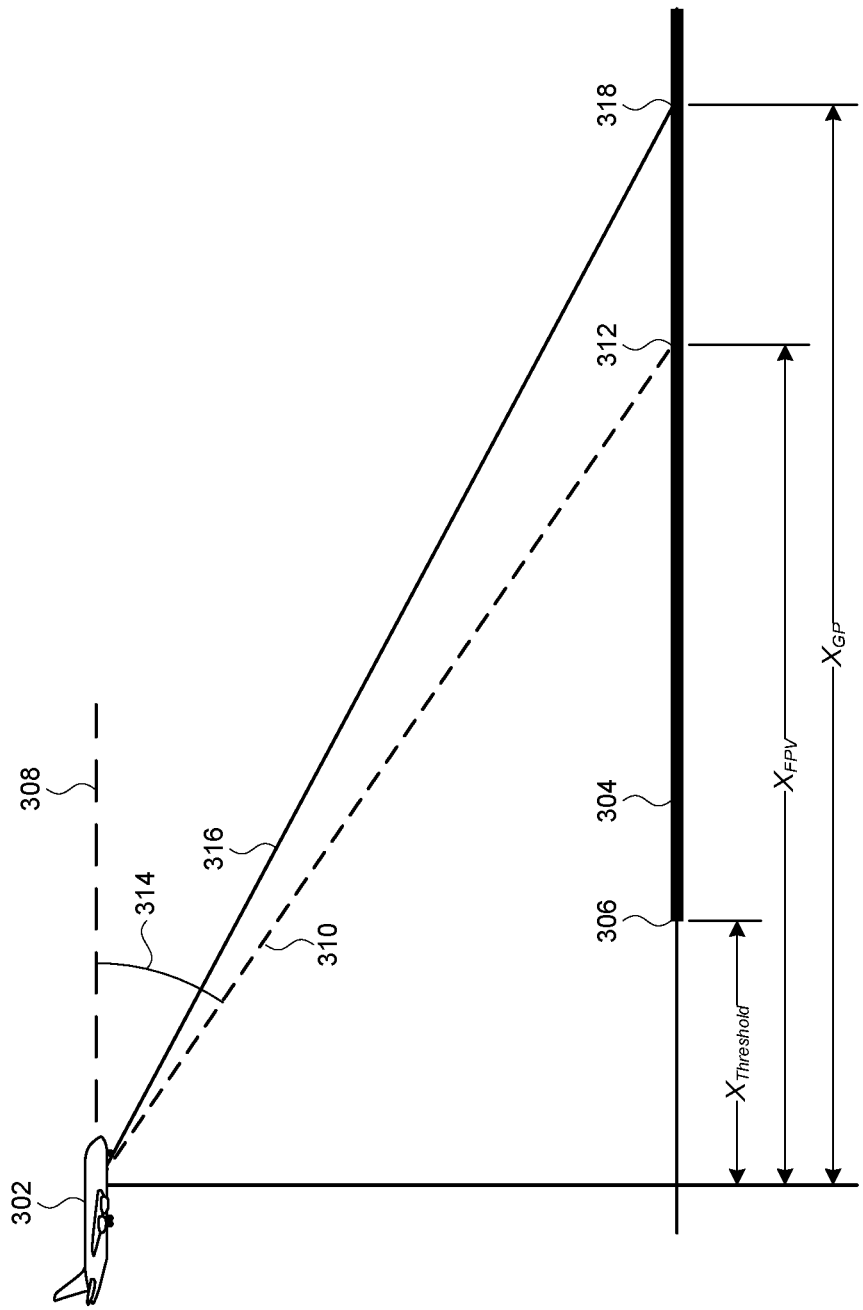
FIG. 3 depicts an aircraft as it is approaching a runway for a landing.

FIG. 3 depicts an aircraft 302 as it is approaching a runway 304 for a landing. The aircraft 302 is at a horizontal distance, $X_{Threshold}$, away from the front 306 of the runway 304. The aircraft is at an altitude 308 above the runway 304. The aircraft 302 is descending along a flight path vector (FPV) 310 toward the runway 304. The FPV 310 intersects the runway 304 at an FPV point 312 that is a horizontal distance, $X_{FPV}$, away from the aircraft 302. The FPV 310 is at a downward angle 314 with respect to the horizontal altitude 308 of the aircraft 302. The FPV 310 is an expected flight path of the aircraft 302. The FPV 310 can be displayed to a pilot of the aircraft 302 on a primary flight display (PFD) and/or a heads-up display (HUD).

FIG. 3 also depicts a glide path 316 from the aircraft 302 to the runway 304. The glide path 316 intersects the runway 304 at a target point 318 that is a horizontal distance, $X_{GP}$, away from the aircraft 302. The glide path 316 can be based on an instrument landing system (ILS) of the runway 304. An ILS includes a radio transmitter that provides a direction for approaching aircraft that have a receiver tuned to the ILS frequency. The ILS can provide precision guidance to approaching aircraft for landing on a runway, using a combination of radio signals and, in many cases, high-intensity lighting arrays to enable a safe landing. The ILS typically guides the aircraft to land at a predetermined distance beyond the front of the runway. For example, in the FIG. 3, the target point 318 at which the glide path 316 intersects the runway 304 can be a predetermined distances, such as 1000 feet, beyond the front 306 of the runway 304. The glide path 316 can be displayed to a pilot of the aircraft 302 on a PFD and/or a HUD.

Figure 4:
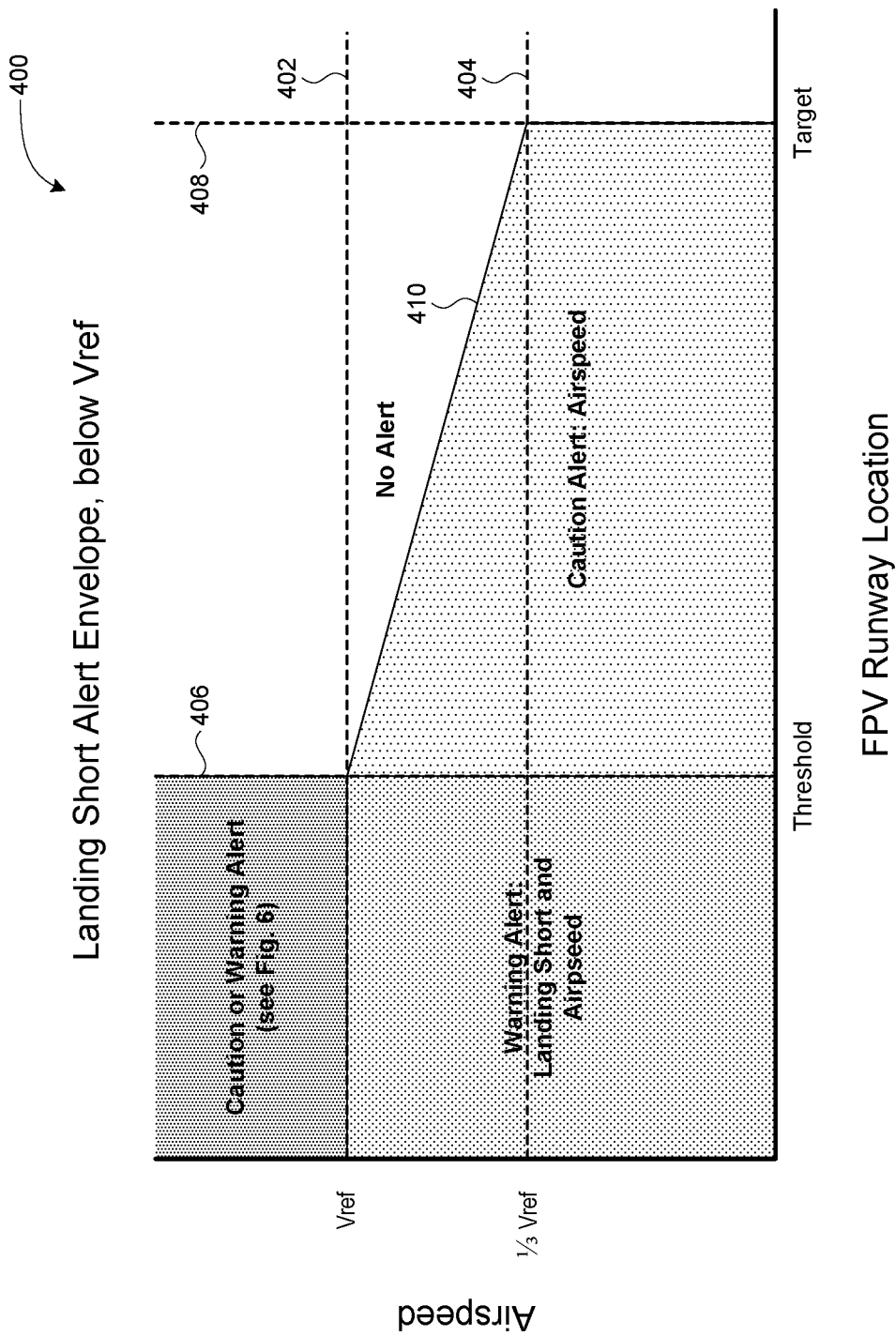
FIG. 4 depicts a chart showing possible alert conditions as an aircraft approaches a runway below a reference landing speed.

FIG. 4 depicts a chart 400 showing possible alert conditions as an aircraft approaches a runway below a reference landing speed. The vertical axis of the chart 400 represents speed of the aircraft on approach. The two speeds depicted on the vertical axis represent $V_{ref}$ 402 and $\frac{1}{3}V_{ref}$ 404. The speed $V_{ref}$ 402 is a landing reference speed. The landing reference speed can be the minimum airspeed at which the aircraft can be expected to maneuver. The landing reference speed can be based on a specific flap setting of the aircraft or on any other information that can affect the minimum airspeed at which the aircraft can be expected to maneuver. Such a landing reference speed can be provided by a flight management system (FMS) on the aircraft or other aircraft-based or land-based computing system. The speed $\frac{1}{3}V_{ref}$ 404 is approximately one third of the $V_{ref}$ speed 402.

The horizontal axis of the chart 400 represents a horizontal location of the point at which the FPV is projected to intersect the runway. The two locations depicted on the horizontal axis represent a threshold location 406 and a target location 408. The threshold location 406 can be a location deemed to be the earliest point at which the aircraft can land safely, such as the front of the runway. The threshold location 406 can also be another location, such as a predetermined distance beyond the front of the runway. The target location 408 can be the location to which an ILS would typically guide the aircraft during a landing. The target location can also be a location at a particular distance beyond the threshold location 406. In some cases, a runway may not have an ILS location or the aircraft may not have data about the ILS location of a runway. In such cases, the target location 408 can be at a predetermined distance beyond the front of the runway, such as 1000 feet beyond the front of the runway.

The point at which the FPV is projected to intersect the runway can be determined by an aircraft-based computing system, such as a TAWS, or by a ground-based computing system. As shown in the chart 400 in FIG. 4, if the point at which the FPV is projected to intersect the runway is below the threshold location 406, then the pilot can be warned with one of two warnings. If the point at which the FPV is projected to intersect the runway is below the threshold location 406 and the current speed of the aircraft is below $V_{ref}$ 402, then the pilot can be warned that the landing is projected to be short and that airspeed should be increased. For example, a visual warning on a PFD and/or a HUD can display the phrase "Landing Short, Increase Airspeed" or an audio warning with those words can be sounded in the cockpit of the aircraft. If the point at which the FPV is projected to intersect the runway is below the threshold location 406 and the current speed of the aircraft is above $V_{ref}$ 402, then the pilot can be given either a caution or a warning alert. The various alerts that can be given in these circumstances are discussed below with respect to FIG. 6.

As shown in the chart 400 in FIG. 4, if the point at which the FPV is projected to intersect the runway is between the threshold location 406 and the target location 408, a determination can be made whether to alert the pilot based on the current speed of the aircraft. Chart 400 depicts an alert threshold line 410. The alert threshold line 410 can be a function of the speed $V_{ref}$ 402, the speed $\frac{1}{3}V_{ref}$ 404, the threshold location 406, and the target location 408. In the example depicted in FIG. 4, the alert threshold line 410 is linear and extends from the intersection of the threshold location 406 and the speed $V_{ref}$ 402 to the intersection of the target location 408 and the speed $\frac{1}{3}V_{ref}$ 404. Other embodiments of the alert threshold line 410 are possible, such as alert threshold line 410 being a nonlinear curve, alert threshold line 410 starting and ending at different locations, and the like.

In the example depicted in FIG. 4, the alert threshold line 410 is determined using the following point-to-point linear equation:

$$y - y_1 = \left(\frac{y_2 - y_1}{x_2 - x_1}\right)(x - x_1) \quad (1)$$

The variables in the point-to-point linear equation can be defined using values that can be known about the aircraft on approach:

$x = X_{FPV}$ = Distance to FPV location on the runway;
$x_1 = X_{GP}$ = Distance to target runway location;
$x_2 = X_{Threshold}$ = Distance to runway threshold;
$y = V_{Current}$ = Current Airspeed;

$$y_1 = \frac{1}{3}V_{ref} = 1/3 \text{ landing reference speed};$$

and
$y_2 = V_{ref}$ = landing reference speed.

In some cases, the location of the FPV along the runway, $X_{FPV}$, may not be provided by an on-board computing system. However, the location of the FPV along the runway, $X_{FPV}$, can be calculated by multiplying the altitude of the aircraft above the runway by the tangent of the FPV angle (i.e., $X_{FPV} = A_{Aircraft} \tan \theta_{FPV}$). Once those variables are replaced into Equation 1, a determination can be made whether the current speed and FPV runway location of the aircraft falls above or below the alert threshold line 410 using the following equations:

$$V_{Current} \geq \left(\frac{V_{ref} - \frac{1}{3}V_{ref}}{X_{Threshold} - X_{GP}}\right)(X_{FPV} - X_{GP}) + \frac{1}{3}V_{ref} \quad (2)$$

$$V_{Current} < \left(\frac{V_{ref} - \frac{1}{3}V_{ref}}{X_{Threshold} - X_{GP}}\right)(X_{FPV} - X_{GP}) + \frac{1}{3}V_{ref} \quad (3)$$

If Equation 2 is satisfied (i.e., the current speed and FPV runway location of the aircraft is at or above the alert threshold line 410), then no alert is issued. However, if Equation 3 is satisfied (i.e., the current speed and FPV runway location of the aircraft is below the alert threshold line 410), then a caution alert can be issued about the aircraft's airspeed. For example, a visual caution can be shown on a display, such as a navigation display (ND), with the phrase "Caution: Airspeed" and an audio caution with those words can be sounded in the cockpit of the aircraft.

One benefit to using the chart depicted in FIG. 4 is that the aircraft can determine whether to alert the pilot even if the pilot has not engaged the ILS on the aircraft. The only possible ILS-related item of data is the target location 408 which is a fixed point on the runway. If the aircraft has a database of runways that includes the ILS location for each runway, a computing system on the aircraft can determine whether to alert the pilot based on the current airspeed and the FPV runway location even if the ILS on the aircraft is not engaged or working properly. If the aircraft does not have a database of runways that includes the ILS location for each runway, a computing system on the aircraft can determine the target location to be a particular distance in front of the runway threshold. In either case, the warning system is operable without the use of an ILS system.

Figure 5:
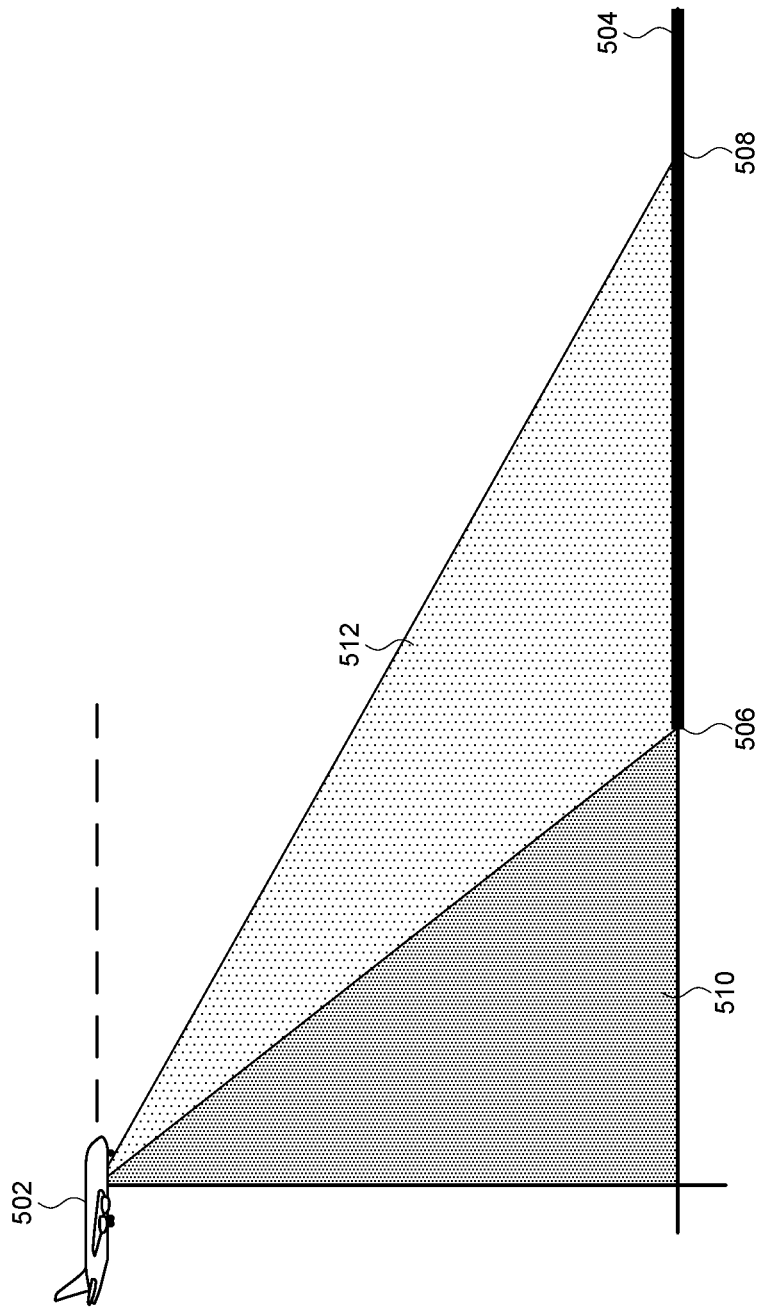
FIG. 5 depicts an aircraft on approach to a runway at a speed below the aircraft's reference landing speed.

FIG. 5 depicts an aircraft 502 on approach to a runway 504 at a speed below the aircraft's reference landing speed. The runway 504 has a runway threshold 506 and a target landing location 508. FIG. 5 also depicts a first FPV zone 510 and a second FPV zone 512 indicating zones in which possible flight path vectors from the aircraft 502 may fall. If the flight path vector of the aircraft 502 is located in the first FPV zone 510 (i.e., if the flight path vector of the aircraft 502 indicates that the aircraft 502 will be short of the threshold 506 of the runway 504), then a warning alert can be issued about a short landing and about the low aircraft speed. If the flight path vector of the aircraft 502 is located in the second FPV zone 512 (i.e., if the flight path vector of the aircraft 502 indicates that the aircraft 502 will land between the threshold 506 of the runway 504 and the target landing position 508 of the runway 504), then a determination can be made whether to issue a caution alert about the aircraft's airspeed. Whether a caution alert is issued can be based on whether the current airspeed of the aircraft is less than a landing short envelope. The landing short envelope can be a function of the current airspeed, the runway threshold, and the target runway location. One example of a landing short envelope is the alert threshold line 410 described above with respect to FIG. 4.

Figure 6:
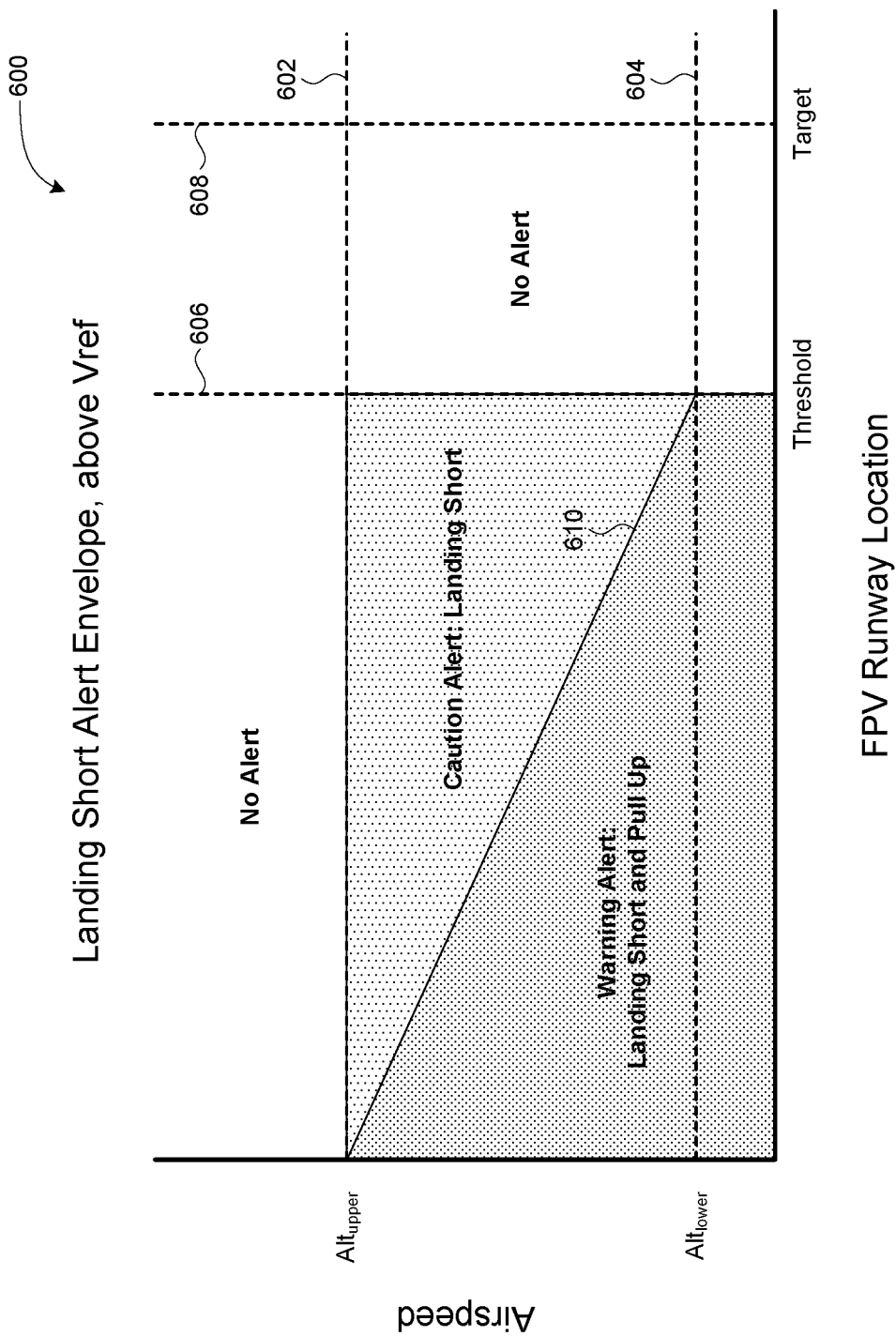
FIG. 6 depicts a chart showing possible alert conditions as an aircraft approaches a runway above a reference landing speed.

FIG. 6 depicts a chart 600 showing possible alert conditions as an aircraft approaches a runway above a reference landing speed. The vertical axis of the chart 600 represents altitude of the aircraft with respect to the runway. The altitudes depicted on the vertical axis represent $Alt_{upper}$ 602 and $Alt_{lower}$ 604. The altitude $Alt_{upper}$ 602 is an upper limit of a short landing alert. In one example, the altitude $Alt_{upper}$ 602 can be an altitude of 450 feet above the elevation of the runway. Using the altitude $Alt_{upper}$ 602 as an upper limit of a landing short alert can prevent premature short landing warnings. The altitude $Alt_{lower}$ 603 is a lower limit of possible recovery from a short landing to a proper landing. In one example, the altitude $Alt_{lower}$ 604 can be an altitude of 50 feet above the elevation of the runway. Using the altitude $Alt_{lower}$ 604 as a lower limit of an airspeed caution alert can prevent an alert from indicating that a proper landing is still possible when the aircraft has fallen too low and too soon to recover for a proper landing.

The horizontal axis of the chart 600 represents a horizontal location of the point at which the FPV is projected to intersect the runway. The two locations depicted on the horizontal axis represent a threshold location 606 and a target location 608. The threshold location 606 can be a location deemed to be the earliest point at which the aircraft can land safely, such as the front of the runway. The threshold location 606 can also be another location, such as a predetermined distance beyond the front of the runway. The target location 608 can be the location to which an ILS would typically guide the aircraft during a landing. The target location can also be a location at a particular distance beyond the threshold location 606. In some cases, a runway may not have an ILS location or the aircraft may not have data about the ILS location of a runway. In such cases, the target location 608 can be at a predetermined distance beyond the front of the runway, such as 1000 feet beyond the front of the runway.

The point at which the FPV is projected to intersect the runway can be determined by an aircraft-based computing system, such as a TAWS, or by a ground-based computing system. As shown in the chart 600 in FIG. 6, if the point at which the FPV is projected to intersect the runway is beyond the threshold location 606 and the aircraft's speed is above the reference landing speed, then no alert is issued. If the point at which the FPV is projected to intersect the runway is before the threshold location 606 and the aircraft is below the altitude $Alt_{upper}$ 602, either a warning alert is issued about a short landing and the need to pull up or a caution alert is issued that the aircraft may land short. Chart 600 depicts a warning threshold line 610. The warning threshold line 610 can be a function of the altitude $Alt_{upper}$ 602, the altitude $Alt_{lower}$ 604, the current location of the aircraft, and the threshold location 606. In the example depicted in FIG. 6, the warning threshold line 610 is linear and extends from the intersection of the current location of the aircraft and the altitude $Alt_{upper}$ 602 to the intersection of the threshold location 606 and the altitude $Alt_{lower}$ 604. Other embodiments of the warning threshold line 610 are possible, such as warning threshold line 610 being a nonlinear curve, warning threshold line 610 starting and ending at different locations, and the like.

In the example depicted in FIG. 6, the warning threshold line 610 is determined using the point-to-point linear equation of Equation 1. The variables in the point-to-point linear equation can be defined using values that can be known about the aircraft on approach:

x=$X_{FPV}$=Distance to FPV location on the runway;
$x_1$=$X_{Threshold}$=Distance to runway threshold;
$X_2$=$X_{Start}$=Activation distance of the envelope from runway threshold;
y=$Alt_{Current}$=Current altitude;
$y_1$=$Alt_{lower}$=lower limit of a short alert landing; and
$y_2$=$Alt_{upper}$=upper limit of a short alert landing.

In some cases, the location of the FPV along the runway, $X_{FPV}$, may not be provided by an on-board computing system. However, the location of the FPV along the runway, $X_{FPV}$, can be calculated by multiplying the altitude of the aircraft above the runway by the tangent of the FPV angle (i.e., $X_{FPV} = A_{Aircraft} \tan \theta_{FPV}$). Once those variables are replaced into Equation 1, a determination can be made whether the altitude and FPV runway location of the aircraft falls above or below the warning threshold line 610 using the following equations:

$$Alt_{Current} \geq \left(\frac{Alt_{upper} - Alt_{lower}}{X_{Start} - X_{Threshold}}\right)(X_{FPV} - X_{Threshold}) + Alt_{lower} \quad (4)$$

-continued
$$Alt_{Current} < \left(\frac{Alt_{upper} - Alt_{lower}}{X_{Start} - X_{Threshold}}\right)(X_{FPV} - X_{Threshold}) + Alt_{lower} \quad (5)$$

If Equation 4 is satisfied (i.e., the current altitude and FPV runway location of the aircraft is at or above the warning threshold line 610), then a caution alert about the aircraft landing short can be issued. However, if Equation 5 is satisfied (i.e., the current altitude and FPV runway location of the aircraft is below the warning threshold line 610), then a warning alert can be issued about a short landing and the need for the aircraft to pull up. Such warning or caution alerts can be visual and/or audio alerts within the cockpit of the aircraft.

Figure 7:
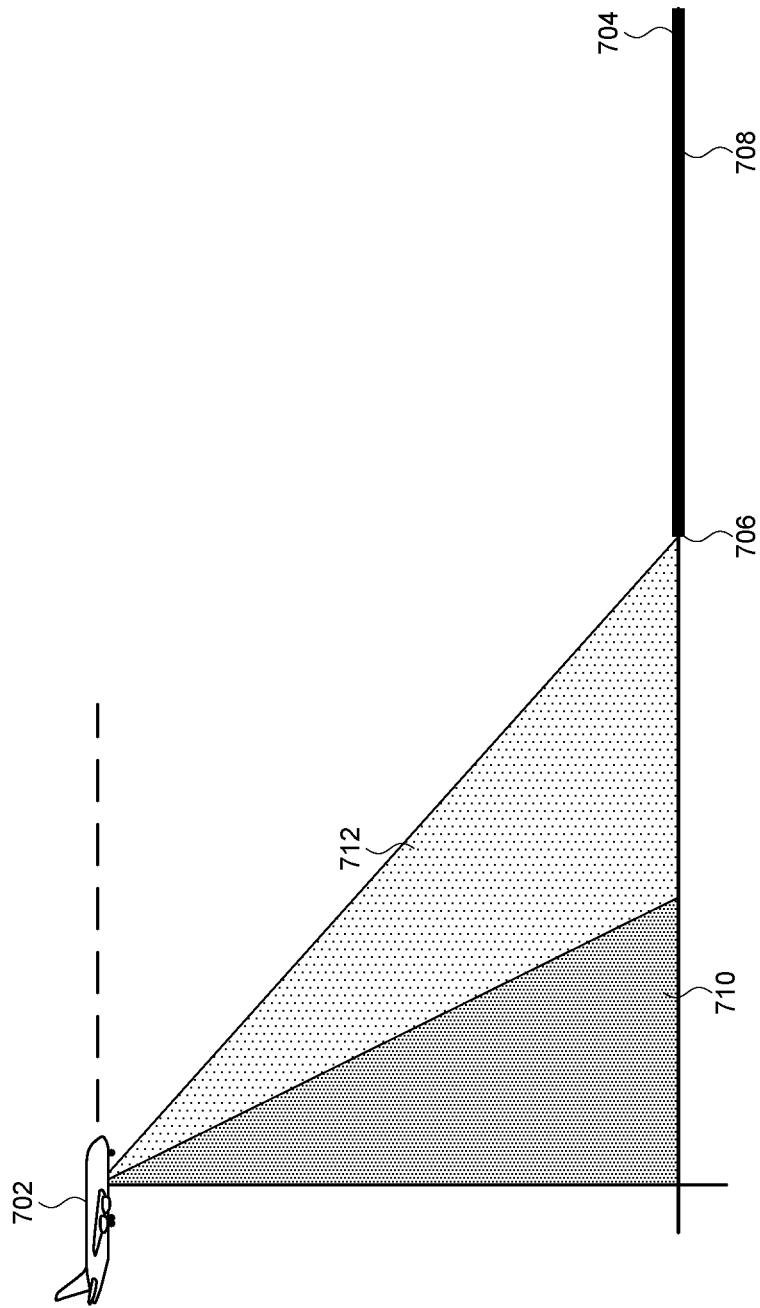
FIG. 7 depicts an aircraft on approach to a runway at a speed above the aircraft's reference landing speed.

FIG. 7 depicts an aircraft 702 on approach to a runway 704 at a speed above the aircraft's reference landing speed. The runway 704 has a runway threshold 706 and a target landing location 708. FIG. 7 also depicts a first FPV zone 710 and a second FPV zone 712 indicating zones in which possible flight path vectors from the aircraft 702 may fall. If the flight path vector of the aircraft 702 is located in the first FPV zone 710 (i.e., if the flight path vector of the aircraft 702 indicates that the aircraft 702 will be short of the threshold 706 of the runway 704 and the combination of altitude of the aircraft and the flight path vector of the aircraft 702 are below the warning threshold line 610), then a warning alert can be issued about a short landing and the need to pull up to avoid a crash. If the flight path vector of the aircraft 702 is located in the second FPV zone 712 (i.e., if the flight path vector of the aircraft 702 indicates that the aircraft 702 will be short of the threshold 706 of the runway 704 and the combination of the altitude of the aircraft and the flight path vector of the aircraft 702 are above the warning threshold line 610), then an landing short caution alert can be issued.

Figure 8:
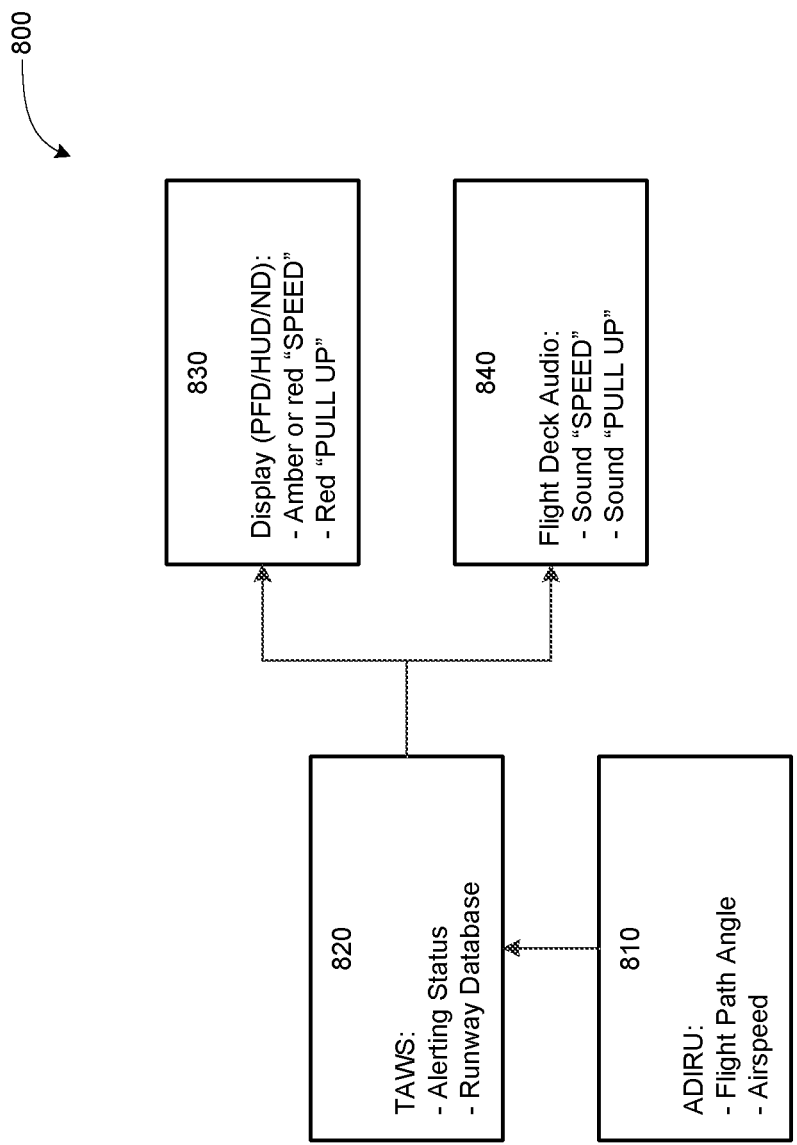
FIG. 8 depicts an example of a system for avoiding short landings by alerting a pilot based on aircraft speed and flight path angle.

FIG. 8 depicts an example of a system 800 for avoiding short landings by alerting a pilot based on aircraft speed and flight path angle. The system 800 includes an ADIRU 810 that can determine current information about the aircraft, such as a flight path angle of the aircraft and an airspeed of the aircraft. The current information about the aircraft can also include an altitude of the aircraft. The system 800 can also include TAWS 820. The ADIRU 810 can pass the current information about the aircraft to the TAWS 820. The TAWS 820 can include a runway database with information about runways at which the aircraft can land. The TAWS 820 can determine an alerting status based on the current information about the aircraft from the ADIRU 810 and based on information from the runway database. In one example, the TAWS 820 can determine an alerting status based on the current airspeed of the aircraft, the FPV runway location of the aircraft, and the target location on the runway. Determining the alerting status can include determining that no alert should be issued or determining that an alert should be issued. If an alert is to be issued, determining the alerting status can include determining the type of alert to be issued.

The system 800 includes a display 830 and a flight deck audio system 840. If the TAWS 820 determines that an alert should be issued, the TAWS 820 can send an indication of the alert to the display 830 and to the flight deck audio system 840. The display 830 can include a PFD, an HUD, a navigation display (ND), and/or any other type of display. The display 830 can be configured to display a visual alert to the pilot if the TAWS 820 sends an indication of an alert. The display can display words or other indications to show the alert. The words or other indications can be in a particular color, such as red or amber, depending on the type of the alert. The words can indicate "speed," "pull up," and/or any other type of words. The flight deck audio system 840 can be configured to sound an audio alert to the pilot if the TAWS 820 sends an indication of an alert. The flight deck audio system 840 can sound certain words—such as "speed" or "pull up"—or any other sounds to alert the pilot. The flight deck audio system 840 can make the sounds at particular volumes based on the type of alert.

The system 800 depicted in FIG. 8 can be embodied in one or more computing systems. For example, the entire system 800 can be embodied in a single computing system on the aircraft such that the ADIRU 810, the TAWS 820, the display 830, and the flight deck audio system 840 are part of the same computing system. In another example, each of the ADIRU 810, the TAWS 820, the display 830, and the flight deck audio system 840 can be in different computing systems on the aircraft. In such a case, the different computing systems can communicate with each other via wired and/or wireless communication links. In another example, some portions of the system 800 may not be located on the aircraft, such as a runway database that is located in a computing system that is not in the aircraft. In such a case, the TAWS 820 may communicate with a land-based computing device that has the runway database to get information from the runway database. Communications between the aircraft and the ground-based computing device can be made via radio waves that are transmitted directly from the aircraft to a land-based receiver, transmitted from the aircraft to a land-based receiver via a satellite, or transmitted in any other manner.

One advantage of the system 800 depicted in FIG. 8 is that the system 800 can be implemented in existing aircraft with existing computing systems. For example, the system 800 can be implemented using software that is compatible with TAWS and LRU that already exist on particular aircraft. Thus, creating the system 800 can include updating or installing software onto existing computing systems on an aircraft.

Figure 9:
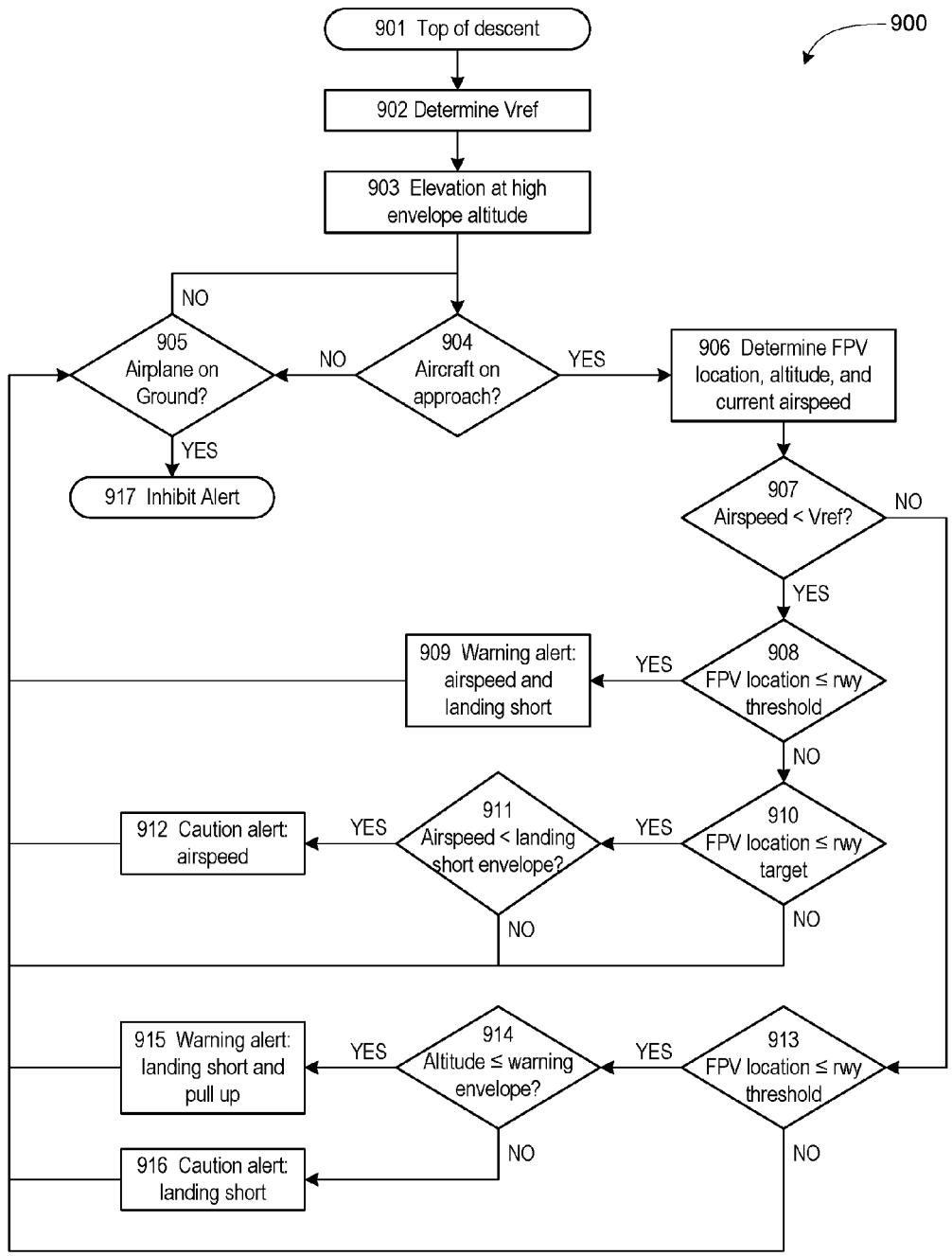
FIG. 9 depicts a method for determining whether to alert a pilot during an aircraft's descent to a runway.

FIG. 9 depicts a method 900 for determining whether to alert a pilot during an aircraft's descent to a runway. The method can begin at block 901 when the aircraft's descent to the runway begins. At block 902, a reference landing speed $V_{ref}$ can be determined for the aircraft's descent. The reference landing speed $V_{ref}$ can be calculated by a flight management system (FMS) or by any other computing system. The remaining portions of the system, from blocks 904 to 917 can be determined by a TAWS, an enhanced ground proximity warning systems (EGPWS), or by any other computing system.

At block 903, the method can wait until the elevation of the aircraft is at some high envelope altitude above the elevation of the runway. In one example, the high envelope altitude can be 450 feet above the elevation of the runway. Waiting until the aircraft is at the predetermined altitude above the elevation of the runway can ensure that short landing alerts are not issued prematurely. At block 904, a determination can be made whether the aircraft is on approach for the runway. An aircraft can be on approach if it is lined up with or on route to the runway. Making this determination can prevent unintended alerts before the aircraft is on approach for the runway. If, at block 904, it is determined that the aircraft is not on approach for the runway, then the method can proceed to block 905 where a determination is made whether the aircraft is on the ground. Block 905 is described in more detail below. However, if, at block 904, it is determined that the aircraft is on approach for the runway, then the method can proceed to block 906. At block 906, information about the aircraft can be determined, such as the FPV location on the runway, the altitude, and the current airspeed of the aircraft. As described above, the FPV location can be the location at which the aircraft is projected to be at the runway elevation based on current conditions.

At block 907, a determination can be made whether the current airspeed of the aircraft is below the reference landing speed of the aircraft. If, at block 907, it is determined that the current airspeed of the aircraft is less than the reference landing speed of the aircraft, then the method can proceed to block 908. At block 908, a determination can be made whether the FPV location is at or before a runway threshold. The runway threshold can be the front of the runway or some location beyond the front of the runway. If, at block 908, it is determined that the FPV location is at or before the runway threshold, then the method can proceed to block 909. At block 909, a warning alert can be issued about the current airspeed of the aircraft and a short landing. The warning alert issued at block 909 can be a visual and/or audio alert in the cockpit of the aircraft. The warning alert issued at block 909 can also indicate that airspeed should be increased. After the warning alert is issued at block 909, the process can proceed to block 905 where a determination is made whether the aircraft is on the ground.

Returning back to block 908, if it is determined that the FPV location is not at or before the runway threshold, then the method can proceed to block 910. At block 910, a determination can be made whether the FPV location is at or before the target runway location. The target runway location can be an ILS location or other location on the runway. If, at block 910, it is determined that the FPV location is not at or before the target runway location, then the method can proceed to block 905 where a determination is made whether the aircraft is on the ground. However, if, at block 910, it is determined that the FPV location is between the runway threshold and the target runway location, then the method can proceed to block 911. At block 911, a determination can be made whether the current airspeed of the aircraft is less than a landing short envelope. The landing short envelope can be a function of the current airspeed, the runway threshold, and the target runway location. One example of a landing short envelope is the alert threshold line 410 described above with respect to FIG. 4. If, at block 911, it is determined that the airspeed is not less than the landing short envelope, then the method can proceed to block 905 where a determination is made whether the aircraft is on the ground. However, if, at block 911, it is determined that the airspeed is less than the landing short envelope, then the method can proceed to block 912. At block 912, a caution alert can be issued about the airspeed of the aircraft. The caution alert issued at block 912 can be a visual and/or audio alert in the cockpit of the aircraft. After the caution alert is issued at block 912, the process can proceed to block 905 where a determination is made whether the aircraft is on the ground.

Returning back to block 907, if it is determined that the current airspeed of the aircraft is not below the reference landing speed of the aircraft, then the method can proceed to block 913. At block 913, a determination can be made whether the FPV location is at or before the runway threshold. If, at block 913, it is determined that the FPV location is not at or before the runway threshold, then the method can proceed to block 905. However, if, at block 913, it is determined the FPV location is at or before the runway threshold, then the method can proceed to block 914. At block 914, a determination can be made whether the current altitude of the aircraft is at or below a warning envelope. The warning envelope can be a function of the current altitude and the FPV location of the aircraft. One example of a warning envelope is the warning threshold line 610 described above with respect to FIG. 6. If, at block 914, it is determined that the current altitude of the aircraft is at or below the warning envelope, then, at block 915, a warning alert can be issued about a short landing and indicating that the aircraft should pull up. The warning alert issued at block 915 can be a visual and/or audio alert in the cockpit of the aircraft. After the warning alert is issued at block 915, the process can proceed to block 905. However, if, at block 914, it is determined that the current altitude of the aircraft is not at or below the warning envelope, then, at block 916, a caution alert can be issued about the aircraft landing short. The caution alert issued at block 916 can be a visual and/or audio alert in the cockpit of the aircraft. After the caution alert is issued at block 916, the process can proceed to block 905.

At block 905, a determination can be made whether the aircraft is on the ground. If, at block 905, it is determined that the aircraft is not on the ground, then the method can return back to block 904 where a determination is made whether the aircraft is on approach for the runway. However, if, at block 905, it is determined that the aircraft is on the ground, then the method can continue to block 917 where the short landing alert system is inhibited and the method ends. From the time that the aircraft's descent reaches the high envelope altitude above the elevation of the runway at block 903 until the plane is on the ground at block 917, the method can repeatedly cycle from block 904 to block 905 and back to block 904. During each cycle, an alert—either a caution alert or a warning alert—can be issued if appropriate or no alert can be issued if appropriate. In this way, the aircraft's descent is monitored and the pilot can be alerted if the aircraft is landing short.

Figure 10:
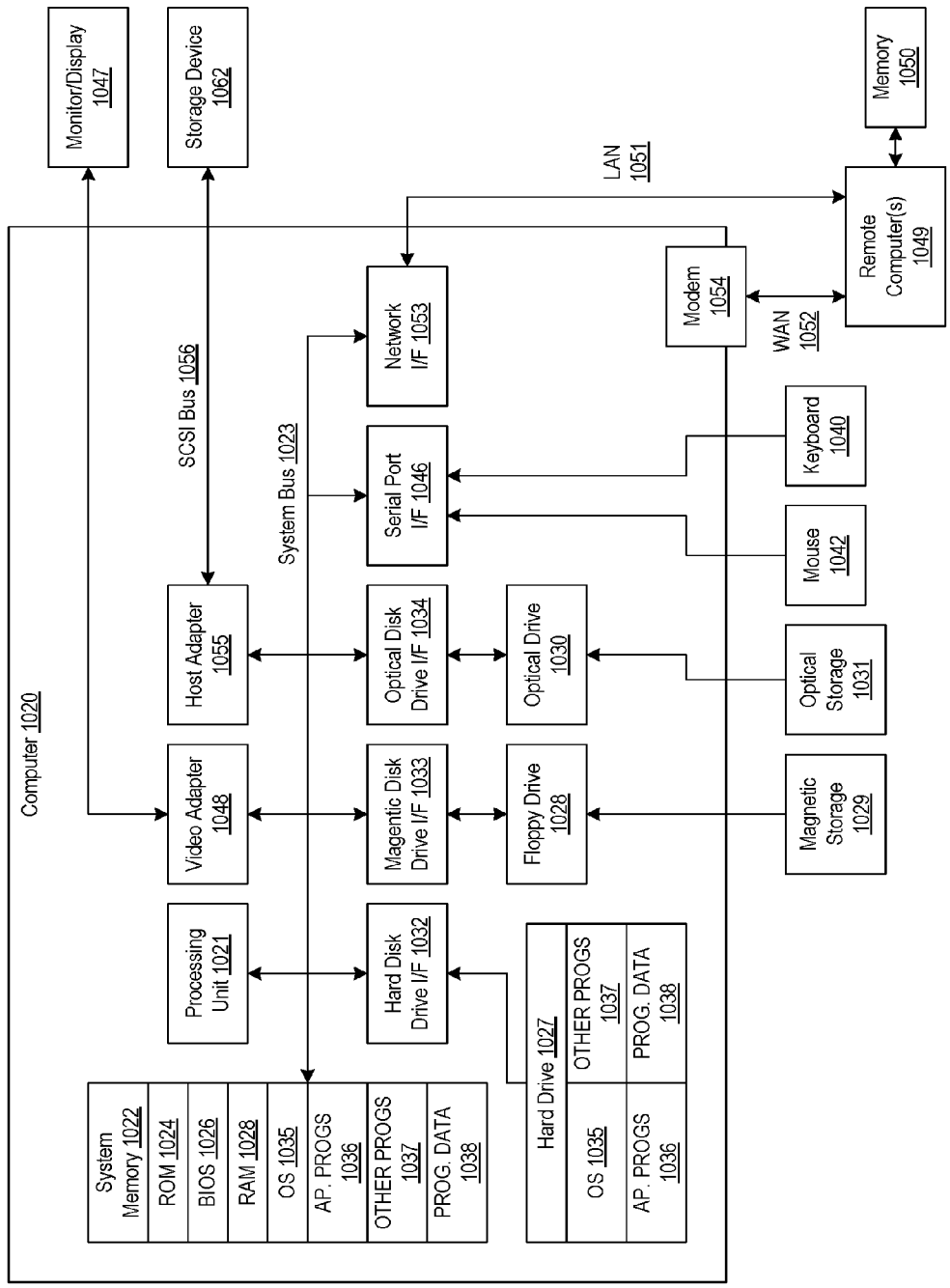
FIG. 10 depicts a block diagram representing a general purpose computer system in which aspects of the methods and systems disclosed herein and/or portions thereof may be incorporated.

FIG. 10 depicts a block diagram representing a general purpose computer system in which aspects of the methods and systems disclosed herein and/or portions thereof may be incorporated. As shown, the exemplary general purpose computing system includes computer 1020 or the like, including processing unit 1021, system memory 1022, and system bus 1023 that couples various system components including the system memory to processing unit 1021. System bus 1023 may be any of several types of bus structures including a memory bus or memory controller, a peripheral bus, and a local bus using any of a variety of bus architectures. The system memory may include read-only memory (ROM) 1024 and random access memory (RAM) 1025. Basic input/output system 1026 (BIOS), which may contain the basic routines that help to transfer information between elements within computer 1020, such as during start-up, may be stored in ROM 1024.

Computer 1020 may further include hard disk drive 1027 for reading from and writing to a hard disk (not shown), magnetic disk drive 1028 for reading from or writing to removable magnetic disk 1029, and/or optical disk drive 1030 for reading from or writing to removable optical disk 1031 such as a CD-ROM or other optical media. Hard disk drive 1027, magnetic disk drive 1028, and optical disk drive 1030 may be connected to system bus 1023 by hard disk drive interface 1032, magnetic disk drive interface 1033, and optical drive interface 1034, respectively. The drives and their associated computer-readable media provide nonvolatile storage of computer-readable instructions, data structures, program modules and other data for computer 1020.

Although the example environment described herein employs a hard disk, removable magnetic disk 1029, and removable optical disk 1031, it should be appreciated that other types of computer-readable media that can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on hard disk drive 1027, magnetic disk 1029, optical disk 1031, ROM 1024, and/or RAM 1025, including an operating system 1035, one or more application programs 1036, other program modules 1037 and program data 1038. A user may enter commands and information into the computer 1020 through input devices such as a keyboard 1040 and pointing device 1042. Other input devices (not shown) may include a microphone, joystick, game pad, satellite disk, scanner, or the like. These and other input devices are often connected to the processing unit 1021 through a serial port interface 1046 that is coupled to the system bus, but may be connected by other interfaces, such as a parallel port, game port, or universal serial bus (USB). A monitor 1047 or other type of display device may also be connected to the system bus 1023 via an interface, such as a video adapter 448. In addition to the monitor 1047, a computer may include other peripheral output devices (not shown), such as speakers and printers. The exemplary system of FIG. 10 may also include host adapter 1055, Small Computer System Interface (SCSI) bus 1056, and external storage device 1062 that may be connected to the SCSI bus 1056.

The computer 1020 may operate in a networked environment using logical and/or physical connections to one or more remote computers or devices, such as remote computer 1049. Remote computer 1049 may be a personal computer, a server, a router, a network PC, a peer device or other common network node, and may include many or all of the elements described above relative to the computer 1020, although only a memory storage device 1050 has been illustrated in FIG. 10. The logical connections depicted in FIG. 10 may include local area network (LAN) 1051 and wide area network (WAN) 1052. Such networking environments are commonplace in police and military facilities, offices, enterprise-wide computer networks, intranets, and the Internet.

When used in a LAN networking environment, computer 1020 may be connected to LAN 1051 through network interface or adapter 1053. When used in a WAN networking environment, computer 1020 may include modem 1054 or other means for establishing communications over wide area network 1052, such as the Internet. Modem 1054, which may be internal or external, may be connected to system bus 1023 via serial port interface 1046. In a networked environment, program modules depicted relative to computer 1020, or portions thereof, may be stored in a remote memory storage device. It will be appreciated that the network connections shown are exemplary and other means of establishing a communications link between computers may be used.

Computer 1020 may include a variety of computer-readable storage media. Computer-readable storage media can be any available tangible, non-transitory, or non-propagating media that can be accessed by computer 1020 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium that can be used to store the desired information and that can be accessed by computer 1020. Combinations of any of the above should also be included within the scope of computer-readable media that may be used to store source code for implementing the methods and systems described herein. Any combination of the features or elements disclosed herein may be used in one or more examples.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. The example systems and components described herein may be configured differently than described. For example, elements may be added to, removed from, or rearranged compared to the disclosed examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

What is claimed is:

1. A method of warning pilots of short landings during a flight of an aircraft, the method comprising:
    determining, by a terrain awareness and warning system (TAWS) operating on the aircraft that the aircraft is on approach to a runway, wherein a runway threshold and a target runway location are associated with the runway;
    receiving, by the TAWS from an inertial reference unit (IRU), a flight path vector (FPV) location of the aircraft based at least in part on a projected landing location with respect to the runway;
    receiving, by the TAWS from the IRU, a current airspeed of the aircraft;
    issuing, by the TAWS, a landing short alert when the FPV location is at or before the runway threshold wherein the landing short alert comprises at least one of the following:
        a landing short caution alert when a current altitude of the aircraft is above a warning threshold line; and
        a short landing and pull up warning alert when the current altitude of the aircraft is below the warning threshold line;
    issuing, by the TAWS, an airspeed caution alert when the FPV location is between the runway threshold and the target runway location and the current airspeed is below a landing short envelope; and
    determining, by the TAWS, not to issue an alert when the TAWS determines that the FPV location is between the runway threshold and the target runway location and that the current airspeed is at or above the landing short envelope;
    wherein the warning threshold line is determined based on at least an upper limit of the landing short alert, a lower limit of the airspeed caution alert, an activation distance of an envelope from runway threshold, a horizontal distance from the aircraft to the runway threshold, and a horizontal distance from the aircraft to the FPV location.

2. The method of claim 1, further comprising:
    determining a landing reference speed based at least in part on a flap setting of the aircraft on approach.

3. The method of claim 2, wherein the FPV location is at or before the runway threshold and a current aircraft speed is below the landing reference speed, and wherein the landing short alert comprises a short landing and airspeed warning alert.

4. The method of claim 1, wherein the warning threshold line is based on the following equation:

$$\left(\frac{Alt_{upper} - Alt_{lower}}{X_{Start} - X_{Threshold}}\right)(X_{FPV} - X_{Threshold}) + Alt_{lower}$$

wherein:
    $X_{FPV}$ is a horizontal distance from the aircraft to the FPV location;
    $X_{Threshold}$ is a horizontal distance from the aircraft to the runway threshold;
    $X_{start}$ is an activation distance of an envelope from runway threshold;
    $Alt_{Current}$ is the current altitude of the aircraft;
    $Alt_{lower}$ is a lower limit of an airspeed caution alert; and
    $Alt_{upper}$ is an upper limit of a short landing alert.

5. The method of claim 2, wherein the airspeed caution alert is issued in response to determining that the current airspeed of the aircraft is less than the landing short envelope.

6. The method of claim 5, wherein the landing short envelope is based on the following equation:

$$\left(\frac{V_{ref} - \frac{1}{3}V_{ref}}{X_{Threshold} - X_{GP}}\right)(X_{FPV} - X_{GP}) + \frac{1}{3}V_{ref}$$

wherein:
$X_{FPV}$ is a horizontal distance from the aircraft to the FPV location;
$X_{GP}$ is a horizontal distance from the aircraft to the target runway location;
$X_{Threshold}$ is a horizontal distance from the aircraft to the runway threshold;
$V_{current}$ is the current airspeed of the aircraft; and
$V_{ref}$ is the landing reference speed.

7. The method of claim 1, wherein one of the landing short alert and the airspeed caution alert is issued by one or more of a display system and an audio system.

8. A system for warning a pilot of an aircraft of a short landing on a runway, the system comprising:
an air data inertial reference unit (ADIRU) configured to determine a flight path vector (FPV) angle of the aircraft and a current airspeed of the aircraft;
a terrain awareness and warning system (TAWS) comprising a runway database having stored therein indications of a runway threshold and a target runway location associated with the runway, wherein the TAWS is further configured to determine a FPV location based on the FPV angle and to determine an alert condition, wherein the alert condition comprises at least one of the following:
a landing short alert when the FPV location is at or before the runway threshold wherein the landing short alert comprises at least one of the following:
a landing short caution alert when a current altitude of the aircraft is above a warning threshold line; and
a short landing and pull up warning alert when the current altitude of the aircraft is below the warning threshold line;
an airspeed short caution alert when the FPV location is between the runway threshold and the target runway location and the current airspeed is below a landing short envelope, and
no alert when the FPV location is between the runway threshold and the target runway location and the current airspeed is at or above the landing short envelope; and
an alert system configured to issue an alert when the alert condition comprises the landing short warning alert or the landing short caution alert;
wherein the warning threshold line is determined based on at least an upper limit of the landing short alert, a lower limit of the airspeed caution alert, an activation distance of an envelope from runway threshold, a horizontal distance from the aircraft to the runway threshold, and a horizontal distance from the aircraft to the FPV location.

9. The system of claim 8, wherein the ADIRU, the TAWS, and the alert system are located on the aircraft.

10. The system of claim 8, wherein the alert system comprises a display configured to display a word or an indication of the alert condition.

11. The system of claim 8, wherein the alert system comprises an audio system configured to sound a word or a noise of the alert condition.

12. The system of claim 8, wherein the TAWS and the ADIRU are part of one or more computing systems.

13. The system of claim 8, wherein the target runway location is an instrument landing system (ILS) location on the runway.

14. The system of claim 13, wherein the TAWS is configured to determine the alert condition when an ILS system of the aircraft is not enabled.

15. A non-transitory computer readable medium having instructions embodied thereon, the instructions comprising instructions that, when executed by a terrain awareness and warning system (TAWS), cause the computing system to:
determine, by the TAWS, that an aircraft is on approach to a runway, wherein a runway threshold and a target runway location are associated with the runway;
receive, by the TAWS from an inertial reference unit (IRU), a flight path vector (FPV) location of the aircraft based at least in part on a projected landing location on the runway;
receive, by the TAWS from the IRU, a current airspeed of the aircraft;
issue, by the TAWS, a landing short alert to a pilot of the aircraft when the FPV location is at or before the runway threshold wherein the landing short alert comprises at least one of the following:
a landing short caution alert when a current altitude of the aircraft is above a warning threshold line; and
a short landing and pull up warning alert when the current altitude of the aircraft is below the warning threshold line;
issue, by the TAWS, an airspeed caution alert when the FPV location is between the runway threshold and the target runway location and the current airspeed is below a landing short envelope, or
determine, by the TAWS, not to issue an alert when the FPV location is between the runway threshold and the target runway location and the current airspeed is at or above the landing short envelope;
wherein the warning threshold line is determined based on at least an upper limit of the landing short alert, a lower limit of the airspeed caution alert, an activation distance of an envelope from runway threshold, a horizontal distance from the aircraft to the runway threshold, and a horizontal distance from the aircraft to the FPV location.

16. The non-transitory computer readable medium of claim 15, the instructions further comprising instructions that, when executed by the TAWS, cause the TAWS to:
determine a landing reference speed for a flap setting of the aircraft on approach.

17. The non-transitory computer readable medium of claim 16, wherein the landing short alert is issued, and wherein issuing the landing short alert comprises issuing a pull up warning when the current airspeed is greater than or equal to the landing reference speed.

18. The non-transitory computer readable medium of claim 16, wherein the landing short alert is issued, and wherein issuing the landing short alert comprises issuing an increase airspeed warning when the current airspeed is less than the landing reference speed.

\* \* \* \* \*

UNITED STATES PATENT AND TRADEMARK OFFICE
CERTIFICATE OF CORRECTION

PATENT NO. : 9,522,742 B2  
APPLICATION NO. : 14/218672  
DATED : December 20, 2016  
INVENTOR(S) : Mark Hall Henderson Page 1 of 1

It is certified that error appears in the above-identified patent and that said Letters Patent is hereby corrected as shown below:

In the Claims

Column 15

Lines 55-57, delete the text, "an alert system configured to issue an alert when the alert condition comprises the landing short warning alert or the landing short caution alert;"
And insert the text, --an alert system configured to issue an alert when the alert condition comprises the landing short caution alert or the airspeed short caution alert;--

Line 60-61, delete the text, "at least an upper limit of the landing short alert, a lower limit of the airspeed caution alert,"
And insert text, --at least an upper limit of the landing short alert, a lower limit of the airspeed short caution alert,--

Column 16

Line 19, delete the text, "warning system (TAWS), cause the computing system to:"
And insert the text, --warning system (TAWS), cause a computing system to:--

Signed and Sealed this  
First Day of March, 2022

Drew Hirshfeld  
*Performing the Functions and Duties of the  
Under Secretary of Commerce for Intellectual Property and  
Director of the United States Patent and Trademark Office*